United States Patent
Wykoff, II et al.

(10) Patent No.: US 10,337,696 B2
(45) Date of Patent: Jul. 2, 2019

(54) VEHICLE LENS ASSEMBLY AND LENS MANUFACTURING METHOD

(71) Applicant: Ford Global Technologies, LLC, Dearborn, MI (US)

(72) Inventors: Richard H. Wykoff, II, Commerce Township, MI (US); Barry K. Loucks, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 15/712,939

(22) Filed: Sep. 22, 2017

(65) Prior Publication Data
US 2019/0093858 A1  Mar. 28, 2019

(51) Int. Cl.

| | |
|---|---|
| *F21V 11/00* | (2015.01) |
| *F21V 9/06* | (2018.01) |
| *B29D 11/00* | (2006.01) |
| *F21V 3/06* | (2018.01) |
| *F21S 41/20* | (2018.01) |

(Continued)

(52) U.S. Cl.
CPC .......... *F21V 9/06* (2013.01); *B29D 11/00009* (2013.01); *F21S 41/28* (2018.01); *F21V 3/0625* (2018.02); *F21V 3/10* (2018.02); *B29D 11/00865* (2013.01); *B29K 2033/12* (2013.01);
(Continued)

(58) Field of Classification Search
USPC ........................................................ 362/510
See application file for complete search history.

(56) References Cited

U.S. PATENT DOCUMENTS

| | | | | |
|---|---|---|---|---|
| 4,708,908 | A | * | 11/1987 | Tateoka ........... B29D 11/00865 428/423.1 |
| 6,179,456 | B1 | * | 1/2001 | Nakamura ................ F21V 3/04 362/510 |

(Continued)

FOREIGN PATENT DOCUMENTS

| | | |
|---|---|---|
| JP | 20000222912 | 8/2000 |
| JP | 2001270044 | 10/2001 |

(Continued)

OTHER PUBLICATIONS

Auto Anything, X-Pel Headlight Protection, retrieved from http://www.autoanything.com/lights/60A1218A0A0.aspx on Aug. 3, 2017.

*Primary Examiner* — Rodney E Fuller
(74) *Attorney, Agent, or Firm* — Carlson, Gaskey & Olds, P.C.

(57) ABSTRACT

An exemplary vehicle lens assembly includes, among other things, a transparent base and a transparent film. The transparent film includes a first layer and a second layer. The first layer is bonded directly to the transparent base. The second layer is polymethylmethacrylate-based and is more resistant to ultraviolet radiation than the first layer and the transparent base. An exemplary lens manufacturing method includes, among other things, coextruding a first layer having a first material composition together with a second layer having a second material composition to provide a transparent film. The method further includes bonding the first layer to a transparent base of a vehicle lighting lens. The second material composition is more resistant to ultraviolet radiation than the first material composition.

20 Claims, 3 Drawing Sheets

(51) Int. Cl.
*F21V 3/10* (2018.01)
*B29K 69/00* (2006.01)
*B29K 33/00* (2006.01)

(52) U.S. Cl.
CPC .. *B29K 2069/00* (2013.01); *B29K 2995/0026* (2013.01)

(56) References Cited

U.S. PATENT DOCUMENTS

| | | | |
|---|---|---|---|
| 6,210,028 B1* | 4/2001 | Murakoshi | F21S 48/1258 |
| | | | 313/112 |
| 6,431,735 B2* | 8/2002 | Fraizer | B29C 41/08 |
| | | | 362/509 |
| 8,574,032 B2 | 11/2013 | Norville | |
| 8,709,192 B2* | 4/2014 | Wang | C08J 7/04 |
| | | | 156/231 |
| 10,016,950 B2* | 7/2018 | Bazzo | B29C 45/16 |
| 2002/0093829 A1* | 7/2002 | Pinson | G02B 5/0242 |
| | | | 362/520 |
| 2012/0039084 A1* | 2/2012 | Eckhardt | G02B 5/124 |
| | | | 362/516 |
| 2015/0132552 A1* | 5/2015 | Kang | C08J 5/18 |
| | | | 428/213 |
| 2017/0121528 A1* | 5/2017 | Kim | C09D 7/67 |
| 2017/0219848 A1* | 8/2017 | Kraus | G02C 7/107 |
| 2018/0169916 A1* | 6/2018 | Menoret | B29C 33/74 |

FOREIGN PATENT DOCUMENTS

| | | |
|---|---|---|
| JP | 2008105313 | 5/2008 |
| JP | 2011127199 | 6/2011 |

* cited by examiner

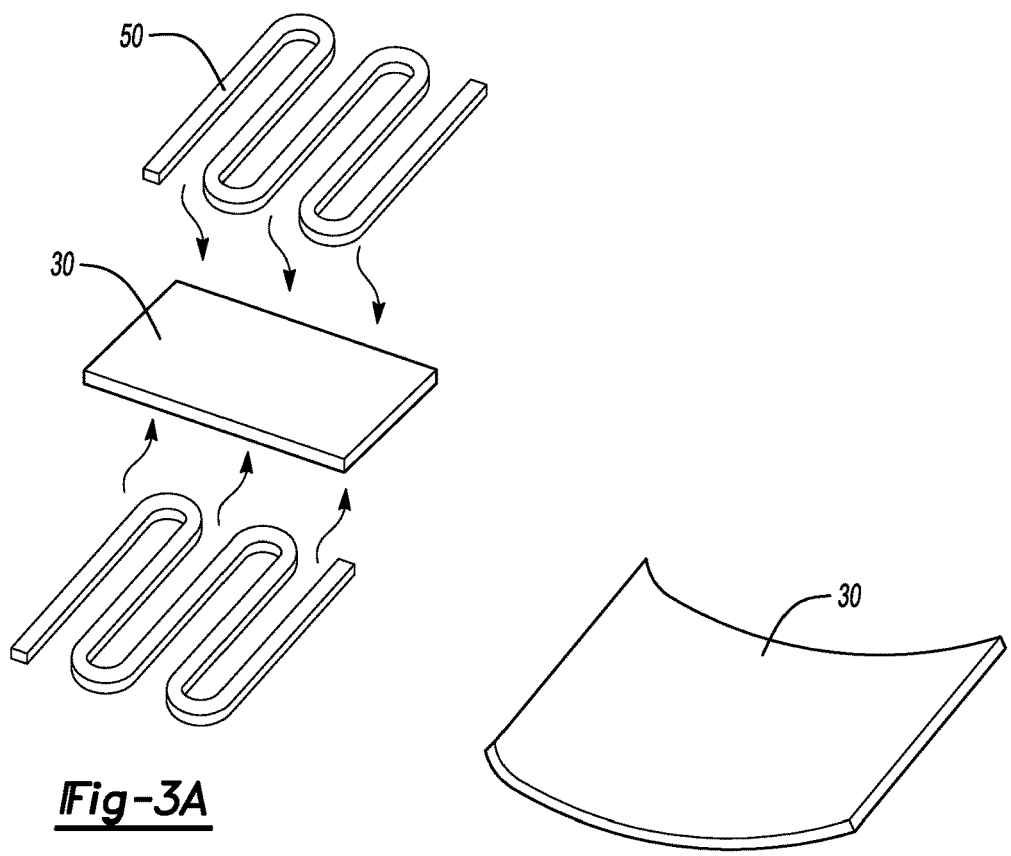
Fig-3A
Fig-3B
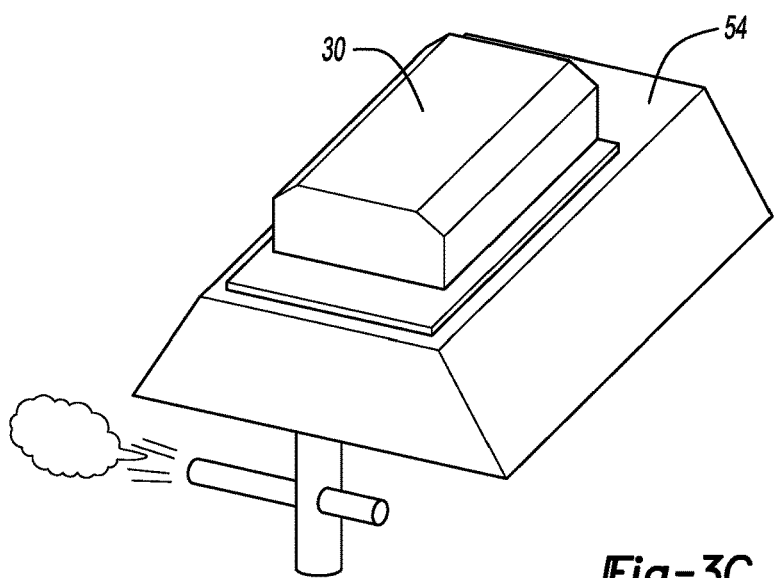
Fig-3C

VEHICLE LENS ASSEMBLY AND LENS MANUFACTURING METHOD

TECHNICAL FIELD

This disclosure relates generally to a lens for a vehicle lamp assembly and, more particularly, to a lens that is resistant to ultraviolet radiation, which can reduce hazing of the lens.

BACKGROUND

Vehicles include various types of lamp assemblies that include lenses. Lamp assemblies can include headlamps, tail lamps, and other types of lamp assemblies. Lamp assemblies include a lens covering a light source. The lens is at least partially transparent to permit light from the light source to emanate from the lamp assembly through the lens.

Some lenses include a polycarbonate material coated with a silicon hardcoat material. The hardcoat is exposed and helps to prevent abrasion of the lens. After sufficient exposure to ultraviolet radiation, such lenses can become hazy and less transparent. Increased exposure to ultraviolet radiation can increase the hazing.

SUMMARY

A vehicle lens assembly according to an exemplary aspect of the present disclosure includes, among other things, a transparent base and a transparent film. The transparent film includes a first layer and a second layer. The first layer is bonded directly to the transparent base. The second layer is polymethylmethacrylate-based and is more resistant to ultraviolet radiation than the first layer and the transparent base.

Another example of the foregoing assembly includes a hardcoat layer sandwiching the transparent film against the transparent base.

In another example of any of the foregoing assemblies, the hardcoat layer is silicon-based.

In another example of any of the foregoing assemblies, the transparent film is an extruded film where the first layer and the second layer are a coextrusion.

In another example of any of the foregoing assemblies, a material composition of the transparent base is the same as a material composition of the first layer.

In another example of any of the foregoing assemblies, the transparent base and the first layer are polycarbonate-based.

In another example of any of the foregoing assemblies, the transparent base and the first layer are polycarbonate.

In another example of any of the foregoing assemblies, a thickness of the second layer is ten percent or less a thickness of the first layer.

In another example of any of the foregoing assemblies, a thickness of the second layer is from 20 to 30 microns, and a thickness of the first layer is from 20 to 400 microns.

In another example of any of the foregoing assemblies, the transparent film is vacuum formed, and the transparent base is overmolded to the transparent film.

In another example of any of the foregoing assemblies, the transparent base and the transparent film are constituents of a vehicle lighting lens.

A lens manufacturing method according to another exemplary aspect of the present disclosure includes, among other things, coextruding a first layer having a first material composition together with a second layer having a second material composition to provide a transparent film. The method further includes bonding the first layer to a transparent base of a vehicle lighting lens. The second material composition is more resistant to ultraviolet radiation than the first material composition.

Another example of the foregoing method includes vacuum forming the transparent film to the transparent base.

Another example of any of the foregoing methods includes, after the bonding, coating the second layer of the transparent film with a hardcoat layer such that the transparent film is sandwiched between the hardcoat layer and the transparent base.

In another example of any of the foregoing methods, the hardcoat layer is wet-coated to the second layer and then cured.

In another example of any of the foregoing methods, the transparent base is overmolded to the transparent film.

In another example of any of the foregoing methods, the transparent base has a third material composition, and the first and third material compositions are the same.

In another example of any of the foregoing methods, the transparent base has a third material composition, and the first and third material compositions are both polycarbonate-based. The second material composition is polymethylmethacrylate-based.

In another example of any of the foregoing methods, the first and third material compositions are polycarbonate, and the second material composition is polymethylmethacrylate.

BRIEF DESCRIPTION OF THE FIGURES

The various features and advantages of the disclosed examples will become apparent to those skilled in the art from the detailed description. The figures that accompany the detailed description can be briefly described as follows:

FIG. 3A illustrates a step in a method of manufacturing the lens assembly of FIG. 2.

FIG. 3B illustrates a step in the method after the step in FIG. 3A.

FIG. 3C illustrates a step in the method after the step in FIG. 3B.

DETAILED DESCRIPTION

This disclosure relates generally to a lens assembly of a vehicle lamp. The lens assembly is exposed to sunlight, and thus exposed to ultraviolet (UV) radiation. The lens assembly incorporates features that resist or block rays of UV radiation from passing through the lens assembly, which can slow the rate at which the lens assembly becomes hazed due to UV radiation.

In an embodiment, the lens assembly incorporates a transparent film having at least two layers coextruded together. One of the layers in the transparent film is more resistant to UV radiation than the remaining layers. The transparent film is bonded to a transparent base of the lens assembly.

The layer of the transparent film that is more resistant to UV radiation can be thin when compared to a thickness of the other layers of the transparent film. Keeping the layer that is more resistant to UV radiation relatively thin can, among other things, reduce the likelihood that an impact load against the lens assembly will induce a brittle fracture of that layer.

Figure 1:
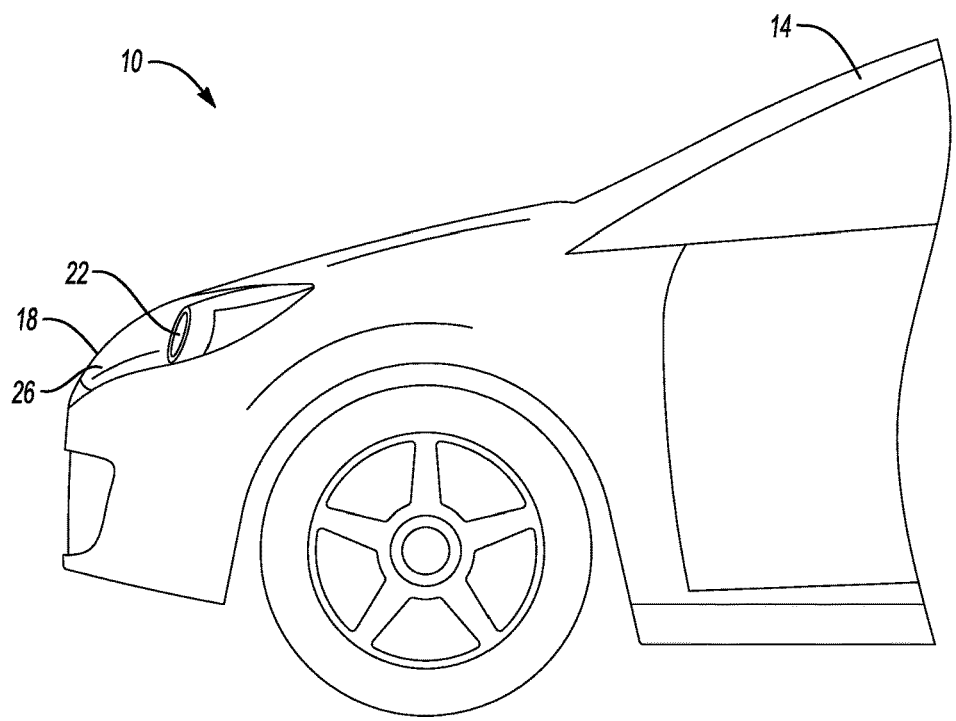
FIG. 1 shows a front view of a vehicle incorporating a lamp assembly having a lens assembly according to an exemplary embodiment of the present disclosure.

Referring to FIG. 1, a front 10 of a vehicle 14 includes a headlamp assembly 18. The vehicle 14 utilizes the headlamp assembly 18 to illuminate areas outside the vehicle 14, such as areas in front of the vehicle 14. The headlamp assembly 18 is an exemplary type of vehicle lighting assembly. Other lighting assemblies include, for example, tail lamps of the vehicle 14, side marker lights, etc.

The headlamp assembly 18 includes a vehicle light source 22 covered by a lens assembly 26. In an exemplary non-limiting embodiment, the light source 22 includes an incandescent bulb, a light emitting diode, a high intensity discharge (HID) lamp, laser light source, or some combination of these. The lens assembly 26 is transparent such that light from the light source 22 can emanate through the lens assembly 26.

Figure 2:
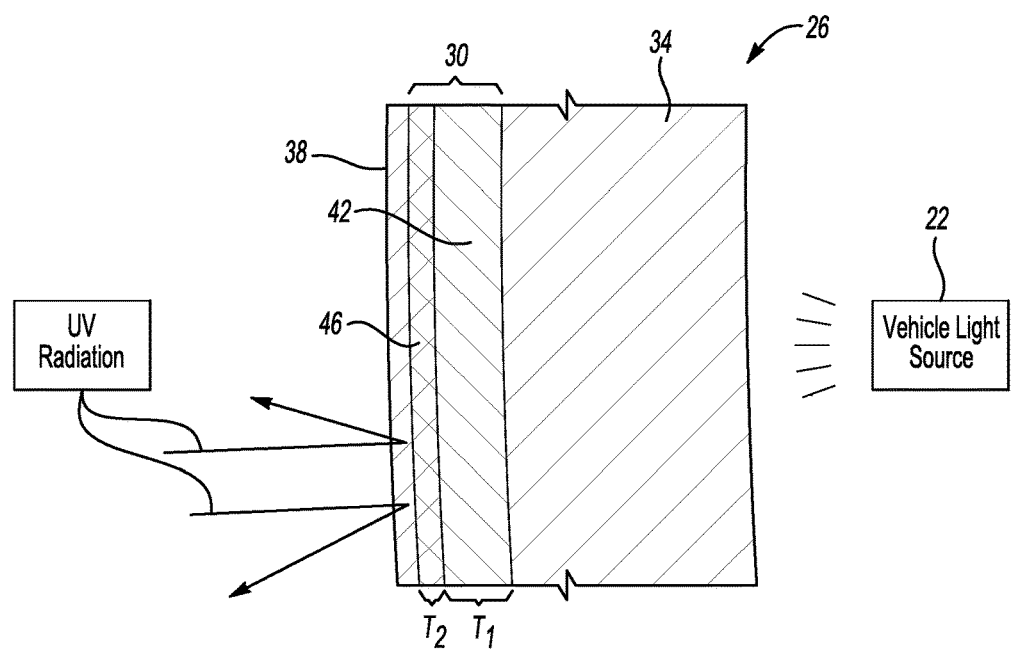
FIG. 2 illustrates a section view through a portion of the lens assembly of FIG. 1.

Referring to FIG. 2 with continuing reference to FIG. 1, the lens assembly 26 is a multilayered structure. In this exemplary embodiment, the lens assembly 26 includes a transparent film 30 bonded to a transparent base 34. A hardcoat layer 38, which is also transparent, then sandwiches the transparent film 30 against the transparent base 34.

The transparent film 30, the transparent base 34, and the hardcoat layer 38 are not required to be transparent in their entirety. That is, there could be areas that are opaque near, for example, an outer perimeter of the lens assembly 26. Desired design characteristics could call for some areas of the transparent film 30, the transparent base 34, and the hardcoat layer 38 to be opaque. Some areas of the transparent film 30, the transparent base 34, and the hardcoat layer 38 remain transparent, however, to permit light from the light source 22 to pass through the lens assembly 26.

The transparent film 30 is a multilayered film. The transparent film 30 includes, at least, a first layer 42 and a second layer 46. In this exemplary embodiment, the first layer 42 is coextruded together with the second layer 46. The transparent film 30 is thus a coextruded film. Coextruding the first layer 42 and the second layer 46 secures the first layer 42 together with the second layer 46.

Notably, a coextruded multilayered film is structurally distinguishable from a multilayered film that is not extruded. The skilled person could section the coextruded multilayer film and observe distinct interfaces where the coextruded multilayer film differs from multilayer films formed my methods other than extrusion. The skilled person would also microtome a section of the coextruded multilayered film and conduct a chemical analysis, microscopy analysis, or both.

The transparent film 30 is bonded to the transparent base 34. In particular, the first layer 42 bonds directly to the transparent base 34 to secure the transparent film 30 to the transparent base 34.

In an exemplary non-limiting embodiment, an overmolding process is used to bond the transparent film 30 to the transparent base 34. The overmolding process involves placing the transparent film 30 within a mold, and then injecting a material into the mold. The material cures to form the transparent base 34. As the transparent base 34 cures within the mold, the first layer 42 bonds to the transparent base 34. The transparent film 30 and the transparent base 34 are then removed from the mold, and the hardcoat layer 38 is applied to the second layer 46 of the transparent film 30 to provide the lens assembly 26.

The transparent base 34, in this exemplary non-limiting embodiment, is primarily polycarbonate (PC) and could optionally include additives. The transparent base 34 is thus considered a PC-based material. A specific example of the transparent base 34 that is PC-based material includes the transparent base 34 as entirely PC without additives, etc. The transparent base 34 is from 2 to 5 millimeters thick in this example.

The first layer 42 has a material composition that is substantially the same as a material composition of the transparent base 34. Thus, in this exemplary embodiment, the first layer 42 of the transparent film 30 is also PC-based and could be, like the transparent base 34, entirely PC.

Making the material composition of the first layer 42 substantially the same as the material composition of the transparent base 34, among other things, facilitates bonding of the first layer 42 to the transparent base 34 to secure the transparent film 30 to the transparent base 34.

The second layer 46 is a material that is more resistant to UV radiation than the first layer 42. The second layer 46, in this exemplary non-limiting embodiment, is primarily polymethylmethacrylate (PMMA) and could optionally include additives, etc. The second layer 46 is thus considered a PMMA-based material. A specific example of the second layer 46 that is PMMA-based includes the second layer 46 as entirely PMMA, without additives.

The resistance of a material to UV radiation refers to the photo-stability of the material, or the ability of the material to resist or block rays of UV radiation. Photo-stability, for purposes of this disclosure refers to the ability of a material to retain integrity upon exposure to UV radiation. Put another way, more rays of UV radiation pass through a material that is less resistant to UV radiation than a material that is more resistant to UV radiation. PMMA is more resistant to UV radiation than PC, as is known.

As the second layer 46 is PMMA-based, and the first layer 42 and transparent base 34 are PC-based, the second layer 46 is more resistant to UV radiation than the first layer 42. The second layer 46 reduces an amount of UV radiation that moves from an exterior of the lens assembly 26 to the first layer 42 and the transparent base 34. This can slow the rate at which the transparent base 34, the first layer 42 of the transparent film 30, or both become hazed due to UV radiation and exposure to sunlight.

The material composition of the second layer 46 is relatively brittle. The hardcoat layer 38 protects the second layer 46 and remaining portions of the lens assembly 26 from abrasions caused by rocks, road debris, etc. In this example, the hardcoat layer 38 is a silicon-based material and could include additives, etc. as required.

Referring again to the transparent film 30, the first layer 42 has a thickness $T_1$ and the second layer 46 has a thickness $T_2$. The thickness $T_2$ of the second layer 46 is kept relatively thin, which can, among other things, facilitate a ductile fracture of the second layer 46 and the base layer 34. If the second layer 46 were thicker, an impact load could result in a brittle failure of the second layer 46 and the base layer 34, which may be undesirable.

In this exemplary embodiment, the thickness $T_2$ is ten percent or less the thickness $T_1$ of the first layer 42. In some more specific embodiments, the thickness $T_2$ of the second layer 46 is from 20 to 30 microns, and the thickness T₁ of the first layer 42 is from 200 to 400 microns.

Figure 3D:
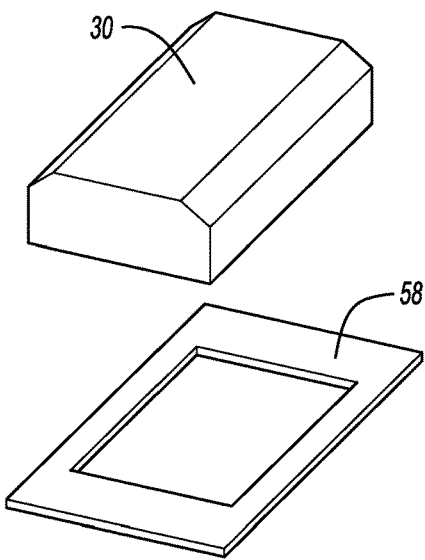
FIG. 3D illustrates a step in the method after the step in FIG. 3C.
Figure 3E:
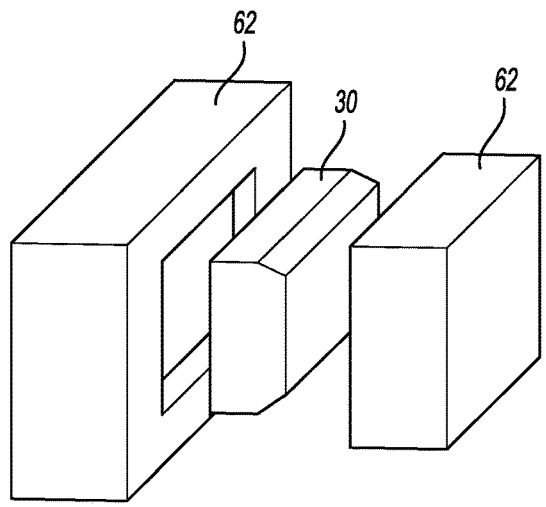
FIG. 3E illustrates a step in the method after the step in FIG. 3D.

Referring now to FIGS. 3A-3G with continuing reference to FIG. 2, a method of manufacturing the lens assembly 26 can begin at a step shown in FIG. 3A where the transparent film 30 is heated by heating elements 50. The heating softens the transparent film 30 as shown in FIG. 3B. The first layer 42 and the second layer 46 are coextruded together to form the transparent film 30 prior to the heating.

The transparent film 30, once softened, is then vacuum-formed over a vacuum-forming mold 54 as shown in FIG. 3C to shape the transparent film 30 into a desired shape for the lens assembly 26. Although described as vacuum-forming, other thermoforming processes could be used to shape the transparent film 30 in the desired shape.

The transparent film 30 then cools to retain the desired shape. The transparent film 30 can then be removed from the vacuum-forming mold 54. After which, excess material 58 can then be removed, if required, as shown in FIG. 3D.

Figure 3F:
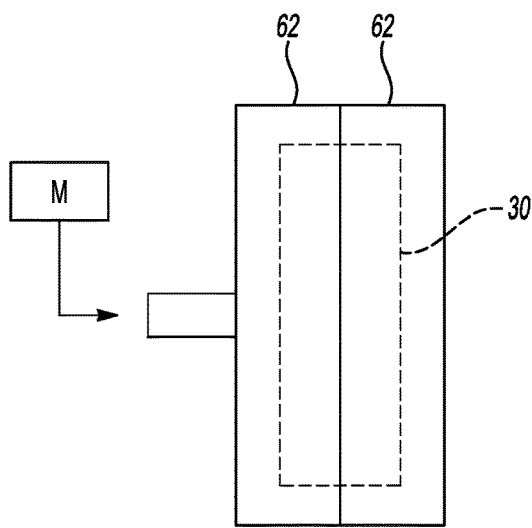
FIG. 3F illustrates a step in the method after the step in FIG. 3E.

Next, the transparent film 30 is placed within a cavity of an injection mold 62. The injection mold 62 is then closed and a material M is injected into the injection mold 62 as shown in FIG. 3F to form the transparent base 34.

Figure 3G:
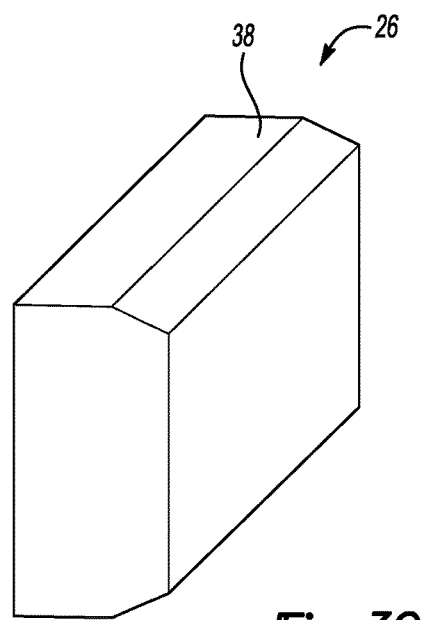
FIG. 3G illustrates a step in the method after the step in FIG. 3F.

The transparent base 34 is injected behind the transparent film 30 to effectively overmold the transparent film 30 together with the transparent base 34. The transparent base 34 then cools within the injection mold 62. After cooling, the transparent base 34 and the transparent film 30 are removed from the mold as shown in FIG. 3G. The hardcoat layer 38 is then applied to the transparent film 30 on the exteriorly facing side of the transparent film 30, which is the second layer 46 of the transparent film 30.

The hardcoat layer 38 can be wet-coated to the second layer 46 of the transparent film 30 by dipping or flow coating the transparent base 34 and the transparent film 30 within the material of the hardcoat layer 38 when the material is liquefied. The first layer 42 is covered by the transparent base 34 such that the hardcoat layer 38 does not directly contact the first layer 42.

After dipping, the hardcoat layer 38 is cured, such as by a thermal or UV radiation curing process to harden the hardcoat layer 38. The hardcoat layer 38 bonds to the second layer 46 during the curing.

Features of the disclosed examples include a lens assembly for a vehicle lamp that is relatively photo stable (i.e., resistant to UV radiation). The photo stability of the lens assembly lessens the speed at which the lens assembly hazes in response to being exposed to sufficient levels of UV radiation. The base structure and the hardcoat layer can be PC-based and provide impact resistance protection to the lens assembly.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle lens assembly, comprising:
a transparent base; and
a transparent film including a first layer and a second layer, the first layer bonded directly to the transparent base, the second layer is polymethylmethacrylate-based and is more resistant to ultraviolet radiation than the first layer and the transparent base.

2. The assembly of claim 1 further comprising a hardcoat layer sandwiching the transparent film against the transparent base.

3. The assembly of claim 2, wherein the hardcoat layer is silicon-based.

4. The assembly of claim 1, wherein the transparent film is an extruded film where the first layer and the second layer are a coextrusion.

5. The assembly of claim 1, wherein a material composition of the transparent base is the same as a material composition of the first layer.

6. The assembly of claim 1, wherein the transparent base and the first layer are polycarbonate-based.

7. The assembly of claim 1, wherein the transparent base and the first layer are polycarbonate.

8. The assembly of claim 1, wherein the second layer is polymethylmethacrylate.

9. The assembly of claim 1, wherein a thickness of the second layer is ten percent or less a thickness of the first layer.

10. The assembly of claim 9, wherein a thickness of the second layer is from 20 to 30 microns, and a thickness of the first layer is from 200 to 400 microns.

11. The assembly of claim 1, wherein the transparent film is vacuum formed, and the transparent base is overmolded to the transparent film.

12. The assembly of claim 1, wherein the transparent base and the transparent film are constituents of a vehicle lighting lens.

13. A lens manufacturing method, comprising:
coextruding a first layer having a first material composition together with a second layer having a second material composition to provide a transparent film; and
bonding the first layer to a transparent base of a vehicle lighting lens, the second material composition more resistant to ultraviolet radiation than the first material composition.

14. The method of claim 13, further comprising vacuum forming the transparent film to the transparent base.

15. The method of claim 14, further comprising, after the bonding, coating the second layer of the transparent film with a hardcoat layer such that the transparent film is sandwiched between the hardcoat layer and the transparent base.

16. The method of claim 15, wherein the hardcoat layer is wet-coated to the second layer and then cured.

17. The method of claim 13, wherein the transparent base is overmolded to the transparent film.

18. The method of claim 13, wherein the transparent base has a third material composition, and the first and third material compositions are the same.

19. The method of claim 13, wherein the transparent base has a third material composition, and the first and third material compositions are both polycarbonate-based, wherein the second material composition is polymethylmethacrylate-based.

20. The method of claim 19, wherein the first and third material compositions are polycarbonate, and the second material composition is polymethylmethacrylate.

* * * * *